United States Patent [19]
Douglas

[11] Patent Number: 5,915,274
[45] Date of Patent: Jun. 22, 1999

[54] METHOD OF CORRECTING IMBALANCE ON A MOTOR VEHICLE WHEEL

[75] Inventor: Michael W. Douglas, St. Peters, Mo.

[73] Assignee: Hunter Engineering Company, Bridgeton, Mo.

[21] Appl. No.: 08/669,892

[22] Filed: Jun. 21, 1996

[51] Int. Cl.[6] .................................................. G01M 1/38
[52] U.S. Cl. ............................................ 73/462; 301/5.21
[58] Field of Search .................... 73/462, 487; 301/5.21, 301/5.22; 702/56

[56] References Cited

U.S. PATENT DOCUMENTS

| | | | |
|---|---|---|---|
| 4,891,981 | 1/1990 | Schonfeld | 73/462 |
| 5,447,064 | 9/1995 | Drechsler et al. | 73/462 |
| 5,471,874 | 12/1995 | Rothamel et al. | 73/462 |
| 5,526,686 | 6/1996 | Fuchs et al. | 73/462 |
| 5,689,069 | 11/1997 | Corghi | 73/462 |

*Primary Examiner*—John E. Chapman
*Attorney, Agent, or Firm*—Gregory E. Upchurch

[57] ABSTRACT

An apparatus and method of correcting imbalance on a motor vehicle wheel/tire assembly. A sensing device coupled to an electronic measuring apparatus is used to scan the wheel in a continuous motion, obtaining the profile of the surface intended for the placement of at least one imbalance correction weight. The balancer computer analyzes the scanned profile and determines the best arrangement of correction weight locations and magnitudes. This system reduces the amount of weight, number of weights, and/or residual imbalance caused by systems where the operator determines the correction planes. The display shows the scanned profile and the weights exactly as the physical wheel and placed weights appear, improving intuitiveness and providing confidence in the measuring apparatus. The correction weight magnitudes and locations can be manually adjusted via the user interface and a real-time display update of required weights and the corresponding residual imbalance. Another improvement minimizes operator weight placement error by using the measuring apparatus and display as a guide to place a weight at the proper angular location on a correction plane.

21 Claims, 8 Drawing Sheets

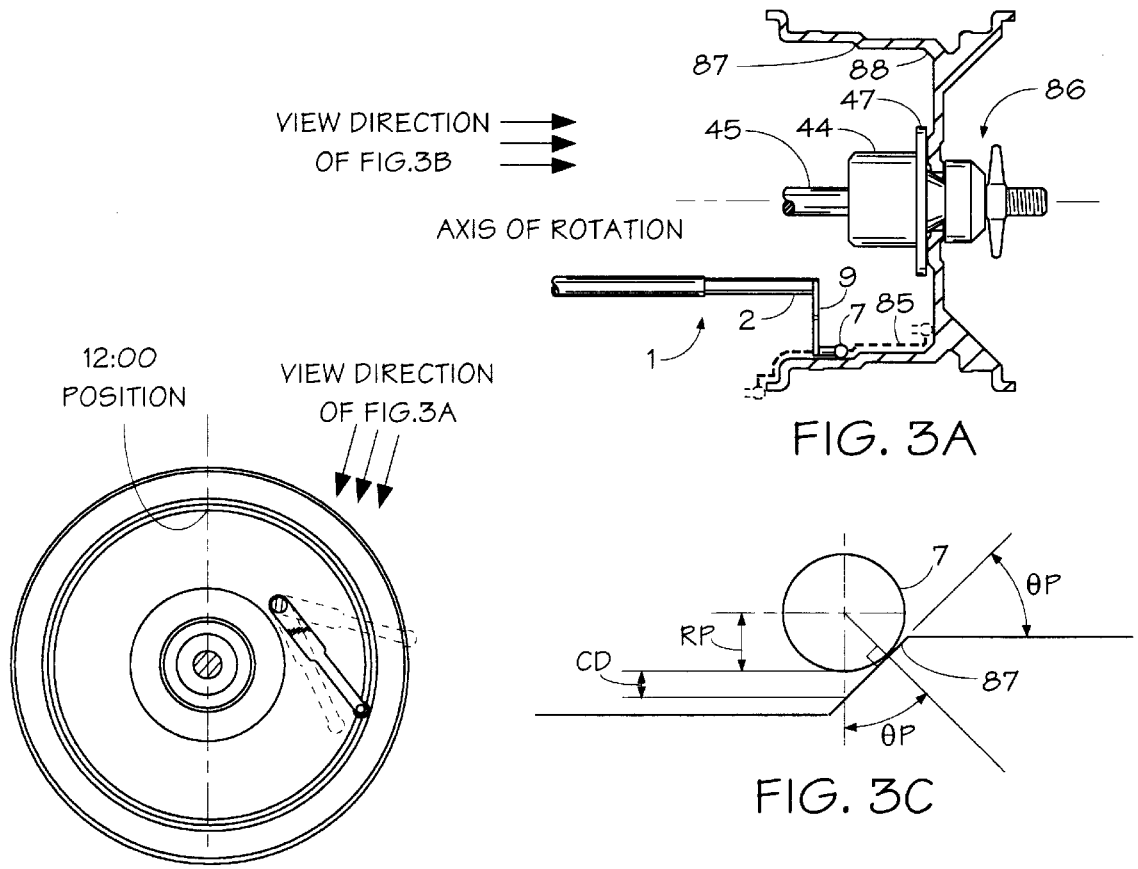
FIG. 3A
FIG. 3B
FIG. 3C
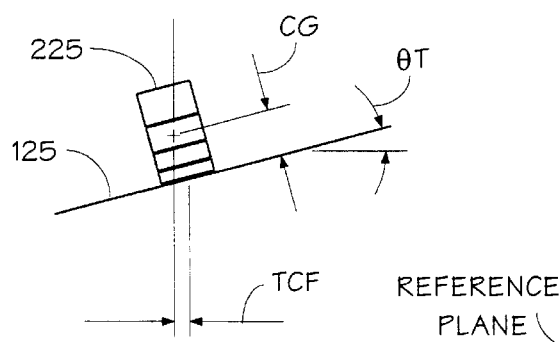
FIG. 3E
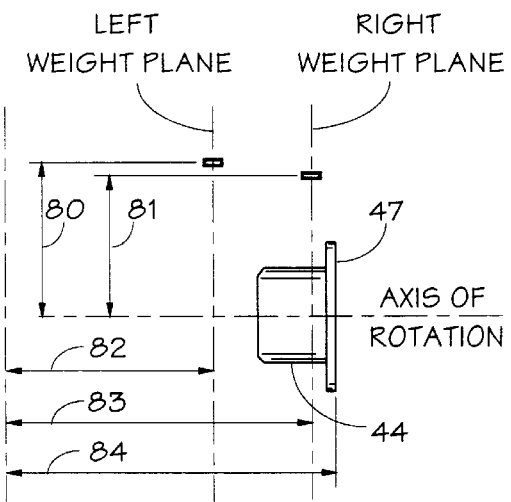
FIG. 3D

PRIOR ART — PRIOR ART — PRIOR ART

"12:00"
ADHESIVE WEIGHT
PLACEMENT
(MEASURING
APPARATUS
NOT USED)

ADHESIVE WEIGHT
PLACEMENT
USING
MEASURING
APPARATUS

"12:00"
CLIP-ON WEIGHT
PLACEMENT
(MEASURING
APPARATUS
NOT USED)

CLIP-ON WEIGHT
PLACEMENT
USING
MEASURING
APPARATUS

METHOD OF CORRECTING IMBALANCE ON A MOTOR VEHICLE WHEEL

BACKGROUND OF THE INVENTION

1. Field of the Invention

The present invention is directed to motor vehicle wheel balancing systems, and more particularly to electronic measurement devices used on such systems for the purpose of entering wheel dimensions needed for determining sizes and locations of imbalance correction weights.

2. Description of the Related Art

It is well known in the automotive wheel balancing art that to compensate for a combination of static imbalance (where the heaviest part of the assembly will seek a position directly below the mounting shaft) and couple imbalance (where the assembly upon rotation causes torsional vibrations on the mounting shaft), at least two correction weights are required which are separated axially along the wheel surface, coincident with weight location "planes". For using clip-on weights the "left plane" comprises the left (innermost) rim lip circumference while the "right plane" comprises the right rim lip. If adhesive weights are used, the planes can reside anywhere between the rim lips, barring physical obstruction such as wheel spokes and welds. With the wheel assembly mounted to the balancer, the relative distances from a reference plane (usually the surface of the wheel mounting hub) to the planes are made known either by manually measuring with pull-out gauges and calipers and then entering the observed values through a keypad, potentiometer, or digital encoder, or by using an automatic electronic measuring apparatus. The radius at which the weights will be placed must also be entered, again either manually or by use of the electronic measuring apparatus. The balancer then determines what angular position the weights must be placed in the left and right weight planes and guides the operator through the display, typically a bar graph pertaining to each weight plane, to rotate the wheel assembly to a rotational position for each plane at which the correction weight is to be placed at the "12:00" position (straight up from the centerline of the wheel).

A problem sometimes arises with such systems when using adhesive weights when the operator enters the weight planes at less than optimum locations. The operator is usually unfamiliar with the importance of maximizing the distance between the two planes and is tempted to locate both near the inside of the wheel, much closer together than possible, for easier reach for weight placement. The closer the planes are together, the more weight is required to correct for the same couple imbalance, and the harder it is to balance below the "blind" (display for a weight plane shows zero if the residual imbalance is below the blind amount). The situation is further aggravated by the fact that adhesive weights are easily mis-applied since there is no physical means forcing the weights to reside on the correction planes as with rim-lip mounted weights. U.S. Pat. No. 4,891,981 discloses a system where an automatic measuring apparatus is used to input the weight planes and is later used again as a placement aid to insure the distances to the applied weights agree with the previously inputted planes. This is an improvement over the prior art as long as the planes are inputted at reasonable locations, but this often is not the case. It also has been observed that the operator is tempted to input the planes at grooves or score lines within wheels to use these features as a reference later to place weights. In the case of a groove, the adhesion of the weight to the wheel is hampered because of the depressed shape of the groove and because the groove allows road water to enter the underside of the weight. In the case of a score line, it is possible that the surface may have a taper which the operator did not notice. If a long strip of adhesive weights is required, a substantial portion of the weight will tilt away from the weight plane as it is pressed to conform to the conical surface formed by the taper, resulting in balancing error. Adhesive weight balancing is even avoided by many operators because of the aforementioned effects from expecting the operator to locate the weight planes. Quite simply, what is needed is to make adhesive weight balancing as easy as clip-on weight balancing.

A second problem with such systems exists because incremental weights are used. Using the most widely used increment of 0.25 oz., the required weight amount, no matter how accurately calculated and no matter to how fine a resolution, must be rounded to this increment. Residual imbalance as high as half the blind per weight plane will certainly occur. U.S. Pat. No. 4,891,981 to Scholdfield discloses a system which provides automatic iteration and comparison of different weight amount increments and angular positions for the two weight planes to minimize residual static imbalance, but it does so at the expense of residual dynamic imbalance. The rounding and blind problem can be overcome by shrewd users by disabling the blind and rounding and repeatedly re-entering the plane locations either manually or with an automatic input device (almost all balancers allow weight recalculation without having to re-spin the wheel assembly) until the displayed weights are very close to available incremental amounts. This process is still very time consuming and requires the operator to interpret the meaning of weights displayed to fine resolution. Furthermore, adjusting one plane location can affect the required amount and location of the weight required for the other plane, potentially confusing the unskilled operator. What is needed is to release the operator from the task of determining where the planes need to be, as well as a fast way to adjust plane locations and to know what the result of the balance job will be because of the adjustment.

A third problem with such systems is angular weight placement error by the operator. Present balancers precisely guide the operator to rotate the wheel to weight placement position to within as little as 0.35 degrees, corresponding to less than 1/16" movement at the lip of a 15" wheel. Unfortunately, the operator must judge for himself where the 12:00 position is for placing the weight. Placement errors of more than ½" are commonplace. The larger the weight, the harder it is to judge the 12:00 position, and the more residual imbalance a misplacement will cause. Working with the inside surface of a wheel to place adhesive weights is the most error prone situation of all since the operator must crouch down and look upside-down into the mounted wheel to see the 12:00 position. Light spotters of various types have been offered which project a line onto the wheel/tire assembly but these devices add cost, can only spot one side of the tire at a time, and/or cannot spot the inside of the wheel for adhesive weight placement. U.S. Pat. No. 5,447,064 to Drechsler discloses a novel electronic measuring apparatus geometry where a pivoting telescoping arm insures that the contact point of the device on the wheel is always at the 12:00 position. This design, however, makes cleaning of the wheel surface for adhesive weights difficult since the contact point is not visible to the operator. Also the design forces the apparatus to reside on top of the weight tray at the front of the balancer even when not in use, exposed to carelessly tossed mounting cones and taking up valuable space in the tray that could have been used for weight storage pockets.

A fourth problem with such systems is that even when the wheel assembly is angularly positioned for a weight placement, it can rotate away when the operator lets go if the static imbalance component overcomes the friction of the mounting shaft bearings and drive system. It is also difficult for the operator to keep from bumping into the assembly while leaning over the tire to judge the 12:00 position. Foot brake devices are offered by some manufacturers to address this problem but their use can make it difficult to reach for weights, instruction manuals, etc., while standing on the foot brake.

A fifth problem exists regarding the display of the data obtained by electronic measuring devices with such systems. Firstly, the operator cannot easily tell if the device is working correctly. The distance and diameter dimensions electronically measured for each weight plane are typically displayed with LED's or as values on a CRT display. Operators tend to trust the electronic measuring device, however, and ignore these displayed values. A measurement in error goes unnoticed and the resulting displayed balance weight amounts and placement angles are incorrect as well. For example: The distance entered for the left plane is usually expressed in mm. If the electronic measuring device is out of calibration and results in a left plane input display of 125 instead of a correct value of 135, the operator is unlikely to notice and will "chase weights", where each spin calls for more weight because the weights are not being placed where the balancer thinks they are. Verifying the accuracy of a display of digits for each wheel balance job would defeat the purpose of electronic dimension entry because some kind of mechanical distance and/or internal diameter gauge would have to be applied at each weight plane and compared to the display digits. Secondly, it is often confusing on such systems when switching between adhesive weight modes and clip-on modes. Because adhesive weight locations are measured at the inside surface of the wheel while clip-on weight locations are measured at the rim lips (nominal rim data), the measurement procedure is different for each type of weight (discounting methods where the adhesive weight locations are estimated based on nominal wheel data). Most systems allow taking data for one type without changing the other. If the user forgets this fact and switches to the other type of weight to balance the wheel, the weight values shown are calculated from data taken from the last wheel assembly which was used in that mode. One manufacturer requires entering adhesive locations as well as rim lip locations before calculating weights; however this requires double the effort and confuses the operator as to why both input procedures must be used when only one type of weight will be used. Some balancers have the capability of switching context between multiple operators where operator B, for example, can interrupt operator A by recalling his last wheel data without retaking of data and without destroying operator A's data. The prior art where the only item that changes is the wheel data is especially dangerous in this case as the operators probably do not remember the dimensions of their particular wheel assemblies. It has been observed that even though some kind of display prompt is given as a reminder as to which operator is currently enabled, operators can accidentally balance their wheels with the wrong operator mode, especially if they did not notice that another operator changed the mode.

SUMMARY OF THE INVENTION

The invention described herein is usable with vehicle wheel balancers and includes an automatic measuring apparatus which is used in a novel method to balance a wheel assembly. In the prior art the user fixed the correction plane locations with the measuring apparatus and the computer then used variable amount and angular location to determine the required weight residing in each weight plane. The present invention uses the apparatus to scan the surface of the wheel and then the balancer computer uses variable weight plane locations as well to present the operator with the best weight arrangement. The computer has effectively an infinite number of planes to place the weights rather than two planes fixed by the operator. The best plane locations, amounts of the weights, and even the number of weights, are calculated to result in a minimized residual static and dynamic imbalance while still using incrementally sized weights. One variation of the invention used a CRT display to show the actual scanned profile of the wheel as well as the relative locations of the weights on the display wheel, enhancing user understanding and providing confidence that the measuring apparatus is working correctly because display wheel looks like the actual wheel. Another novel feature is the ability to move the weight planes, change weight amounts, and/or change the number of weights while observing a real-time residual imbalance display. Also the present invention uses the same measuring apparatus as an angular weight location placement aid by using the contact point between the measuring apparatus and the wheel as the placement spot for a weight, eliminating weight placement errors when the operator must judge the "12:00" placement position. Finally, a new motor drive design for the balancing art automatically indexes and holds the wheel at the proper angular position for weight placement, further enhancing weight placement accuracy.

A first object of the present invention is to provide improved correction weight placement plane locations.

A second object of the present invention is to provide improved balancing using incrementally sized weights.

A third object of the present invention is to reduce the amount of added weight per correction plane.

A fourth object of the present invention is to reduce the required number of planes to one when possible.

A fifth object of the present invention is to provide an improved display of wheel dimensional data to convey to the operator that the measured data agrees with the physical wheel/tire assembly.

A sixth object of the present invention is to provide a method of adjusting the weight arrangements prior to applying weights, guided by a real-time display of resulting residual imbalance condition.

A seventh object of the present invention is to improve operator weight placement accuracy.

An eighth object of the present invention is to provide improved angular wheel positioning accuracy during weight placement.

Other objects and features will be in part apparent and in part pointed out hereinafter.

BRIEF DESCRIPTION OF THE DRAWINGS

FIG. 3A is a combination cross section, diagrammatic illustration showing a typical wheel mounted on a wheel balancer and how the present invention measuring apparatus is used to scan a wheel surface to obtain the entire continuous surface profile available for the placement of weights.

FIG. 3B is a diagrammatic view of FIG. 3A looking towards the mounted wheel, away from the balancer.

FIG. 3C is an enlarged view of the measuring apparatus contacting a tapered wheel surface.

FIG. 3D is the view of FIG. 3A showing the geometric relationships between imbalance and correction weight locations residing on weight correction planes.

FIG. 3E is a side cross-sectional view illustrating an adhesive weight strip applied to the tapered inside surface of a wheel.

Similar reference characters indicate similar parts throughout the several views of the drawings.

DETAILED DESCRIPTION OF THE PREFERRED EMBODIMENTS

Figure 1:
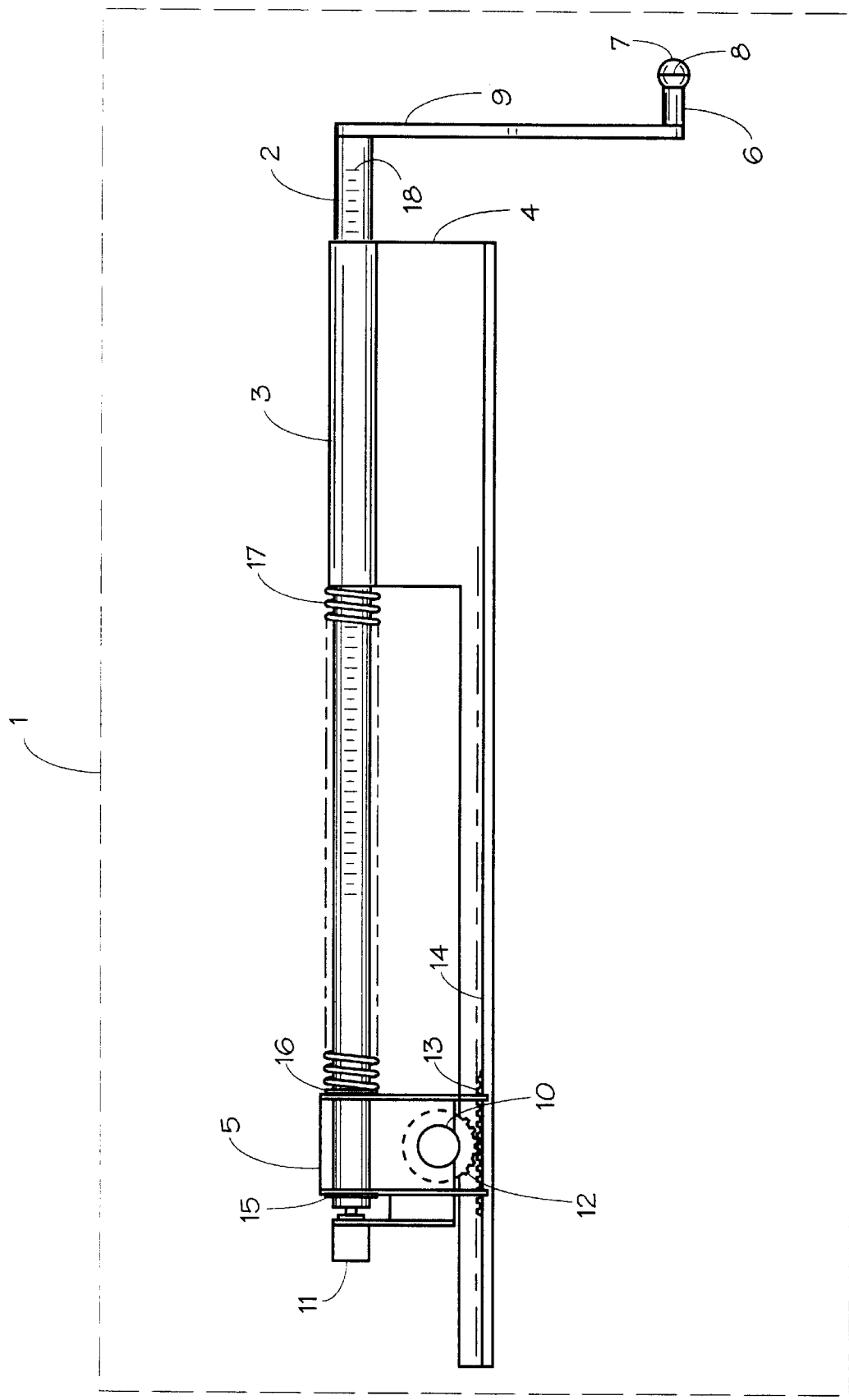
FIG. 1 is a front elevation of the automatic measuring apparatus used in the present invention.
Figure 2:
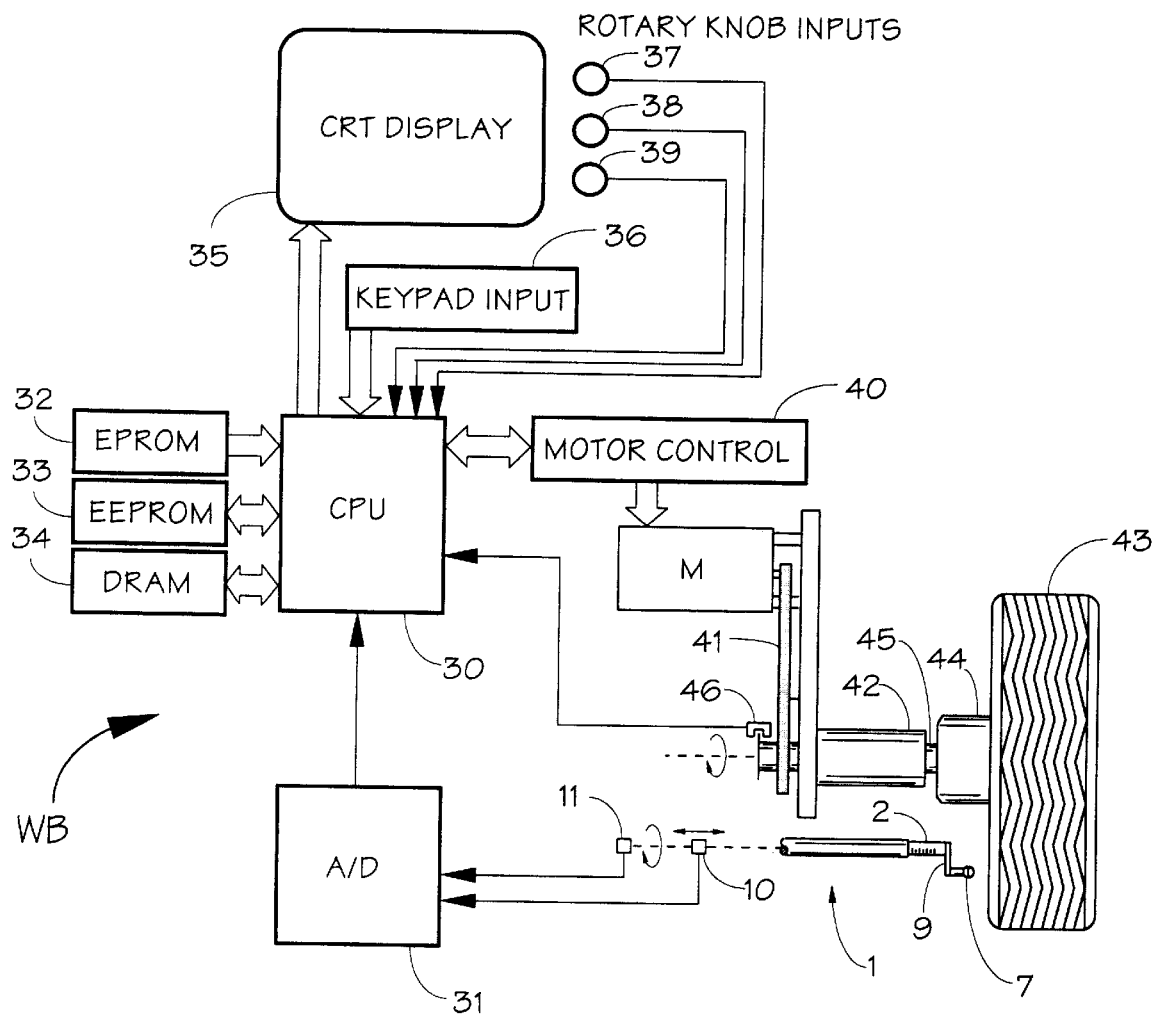
FIG. 2 is a combination diagrammatic plan view, block function diagram of the present invention system.

Turning to the drawings, FIG. 1 illustrates the mechanical aspects of the automatic measuring apparatus 1 used for the present invention. A support tube 3 houses a longitudinally extendible and rotatable shaft 2. A radius arm 9 is fixed to the right end of shaft 2. The other end of the radius arm 9 has a fixed spacer 6 and a spherical "pointer ball" 7. Pointer ball 7 is made of nylon or the like since it is used by the operator to slide across wheel surfaces in a wheel profile scanning mode. For use in a weight locating mode the pointer ball 7 has a line feature 8 through the center of the ball to aid in viewing the contact point between the ball and the wheel surface. The support tube 3 is welded to a bracket 4 which provides the mounting for the apparatus in the wheel balancer WB (FIG. 2). A "C" shaped bracket 5 houses a longitudinal movement transducer 10 which is preferably a rotary potentiometer driven by a gear 12 traveling on a geared rack 13 mounted to bracket 4. Bracket 5 also has holes through which the shaft 2 passes. Bracket 5 is fixed longitudinally to shaft 2 by snap rings 15 and 16, and slides with shaft 2 while being held vertical by slots straddling a bend 14 at the base of bracket 4. Bracket 5 also houses a rotational transducer 11, also a rotary potentiometer, which is directly driven by shaft 2. A return spring 17 pushes the shaft back to the storage position when the apparatus is not in use. A scale 18 is provided on opposing sides of shaft 2 for manual reading by the operator in the event of a problem with the apparatus electronics. It should be noted that with the exception of the pointer ball 7 design and the direct driving of the rotational sensor 11, this mechanical arrangement is a well-known, durable and cost effective design already used in balancers manufactured by the assignee. This design has one disadvantage for being used as a weight placement aid in that radial location of the device (ball) contact point with the wheel varies with wheel diameter (see FIG. 3B), requiring more accurate rotational sensor data than the prior art. This can easily be overcome, however, by eliminating the backlash inherent with gear-driving the rotational sensor and by incorporating compensation software for the device geometry. It will become clear that these improvements plus a novel wheel profile scanning method allow a relatively inexpensive yet durable apparatus to be used in a novel and useful way. The improvements herein could be accomplished with other device geometries that vary the wheel contact point as a function of wheel diameter by using the appropriate compensation software. Likewise, components of the apparatus could be changed. The sensors, for example, instead of potentiometers could be Hall effect sensors, magneto-resistive sensors, or among a myriad of well-known optical sensing technologies.

FIG. 2 illustrates the overall wheel balancer system of the present invention. A rotatable mounting shaft or spindle 45 is driven by motor M via a bi-directional, multi-rpm, variable torque motor drive 40 by a belt 41. For details on the drive see co-pending and co-assigned application Ser. No. 08/594,756 filed Jan. 31, 1996, the disclosure of which is hereby incorporated herein by reference. Mounted on one end of the spindle 45 is a conventional quadrature phase optical shaft encoder 46 which provides rotational position information to the balancer CPU (central processing unit) 30, preferably a Texas Instruments TMS34010 graphics processing chip, capable of executing the balancer software and at the same time driving the CRT display 35. The CPU is connected to EPROM program memory 32, EEPROM memory 33 for storing and retrieving non-volatile information such as calibration and vehicle specific specifications, and DRAM memory 34 for temporary storage. Manual inputs for the present invention entail keypad entry 36 as well as three digital rotary contacting encoders 37, 38, and 39 are of type sold under the trade designation ECLODC24BD0006 by Bournes Inc. During the operation of wheel balancing, at the other end of spindle 45, a wheel/tire assembly 43 under test is removably mounted for rotation with a spindle hub 44 of conventional design. To determine wheel/tire assembly imbalance, the balancer includes at least a pair of force transducers coupled to balance structure 42. These sensors and their corresponding interface circuitry to the CPU 30 are well known in the art, thus are not shown. The automatic measuring apparatus 1 of FIG. 1 is mounted with its longitudinally extendible shaft 2 parallel with the spindle 45 centerline. The apparatus 1 is shown in the plan view with the radius arm 9 rotated slightly away from the downward rest position. The longitudinal sensor 10 senses, instantaneous distances relative to the balancer as the shaft 2 is extended into the wheel while the rotational sensor 11 senses instantaneous radii as the pointer ball 7 is placed in contact with surfaces of the wheel. Both sensors are fed into an A/D (analog to digital converter) which is preferably an Analog Devices AD7871 fourteen (14) bit converter.

FIG. 3A illustrates the process of inputting the wheel profile. A typical wheel is shown (in cross section with the tire removed for clarity) mounted with conventional mounting hardware 86, clamped against the face plate 47 of the mounting hub 44. The measuring apparatus 1 is mounted as close to the spindle 45 centerline as possible while still allowing the extension shaft 2 to clear the mounting hub face plate. To scan the wheel the operator first extends and positions the pointer ball 7 to the farthest distance and smallest radius as physically possible. The computer recognizes this action as a desire to initiate a scan, transmits a confirmation beep, and waits for the apparatus to be held steady. After the apparatus is held steady for approximately 1 second, a beep is transmitted to signal the operator to begin the scan. The pointer ball is dragged against the wheel surface, following the contour all the way to the point where the ball contacts the tire, at which point the ball is again held steady and the CPU responds with a confirmation beep that the scan is finished and the apparatus can be returned to the storage position. The path 85 traveled by the ball and three ball positions during the scan are shown. FIG. 3B shows a view into the wheel of the same three ball positions. Notice that the radial angle from the 12:00 position to the ball contact point with the wheel varies with internal wheel diameter. During the scan the CPU takes pairs of data at predetermined extension distance intervals of 2 mm so that the speed at which the operator moves the arm has no affect on the accuracy or the amount of paired samples acquired. The pairs consist of distance sensor 10 and angle sensor 11 data which after the scan are compensated for the radius of the pointer ball, providing a discrete array of diameters and radii that define the wheel profile. The CPU then uses conventional interpolation and curve fitting methods on the array to produce a second wheel profile array with a radius and distance pair for every 0.5 mm of shaft 2 extension, essentially a continuous array for the purposes of the invention. Finally, the CPU searches the data for tapered surfaces such as the steps 87 and 88 in FIG. 3A. FIG. 3C shows that because the pointer ball does not contact the wheel through its vertical center line the actual radius to the wheel requires an additional distance to be added to radii values corresponding to the tapered surface. This correction distance CD is calculated by:

$$CD = \frac{RP}{\cos \theta P} - RP$$

where RP is the radius of the pointer ball 7 and θP is the angle formed by the taper, determined from the change in radius divided by the change in distance between the data pairs acquired at the endpoints of the tapered surface.

Notice that with the present method the rim lip shape is simultaneously acquired along with the internal profile. This is a sharp contrast to the prior art where rim-lip dimensions (nominal tire bead seating dimensions) are acquired as a separate distinct procedure from adhesive weight plane inputting. There is no confusion as in the prior art as to whether the data shown after changing weight modes pertains to the presently mounted wheel or one which was previously mounted the last time that mode was used. Note further that the present invention could also use a right plane measuring apparatus capable of reaching the right side of the wheel. Like the apparatus of FIG. 1, it could be a variation of an existing proven design (such as that sold under the trade designation Double Dataset by the present assignee on existing wheel balancers). With such a right plane measuring device, the surfaces suitable for adhesive weights and the right rim location can be scanned in exactly the same manner as the left side of the wheel, providing an even more complete wheel profile.

FIG. 3D shows an example weight plane arrangement that could be obtained from any of the data sets from the wheel scanning step. The plane locations are simply distances from some fixed reference plane known to the balancer. In this case the reference plane is an imaginary fixed offset 84 from the face 47 of the mounting hub 44, which yields positive values in mm units along any measurable point reachable by the measuring apparatus. With a particular measured static and couple imbalance obtained from a measurement spin and with a particular set weight plane locations 82, 83 and corresponding radii 80,81, the balancer CPU determines the required weight amount and radial placement angle for a weight in each plane. Because this step by itself is not novel to the art, the actual math involved is not shown herein. For a full explanation of the math performed during this weight calculation, refer to U.S. Pat. No. 5,396,436 to Parker and Douglas.

The balancer CPU then performs the novel step of determining the plane locations, described here by example:

1. Using the wheel profile data, the areas at which adhesive weights should not be placed are determined. This includes the bend at the left rim lip, vertical steps, tapers more than 10 degrees, deep grooves, etc.

2. From the static imbalance, couple imbalance, and available weight plane locations, the CPU determines if it is possible to balance with only one weight (see below for an explanation of this feature). In the present example it is not possible so the CPU proceeds to the next step.

3. The left and right planes are located as far apart as possible, avoiding the areas derived from step 1 by half the known width of the adhesive weight. In this case the left plane is set to 152 mm and the right plane is set to 284 mm.

4. The weight amounts are calculated for these two planes without any blind or rounding applied. In this case the left plane requires 2.39 oz. and the right plane requires 2.04 oz.

5. The left plane distance is adjusted away from the rim lip bend by adding 1 mm and the weights are recalculated. It is important to realize that by relocating only one of the planes the amounts and placement angles for both weights are affected. The process is repeated until one of the weights changes by more than half the weight increment being used.

6. The right weight plane is adjusted in the same manner for each of the trial locations and weight results obtained from step 4, yielding a matrix of adjusted left and right plane locations and the corresponding required weight amounts and placement angles.

7. The best placement is chosen which yields weights closest to the increment being used. For this example the left plane is located at 157 mm and the right plane stays at 284 mm, yielding required weights of 2.49 oz. and 2.00 oz.

8. The weights are rounded to 0.25 oz. and displayed as 2.5 oz., 2.00 oz. along with the required placement angles and the new plane locations.

By the CPU determining the plane locations instead of the operator, two problems with adhesive weight balancing are solved. First, the planes are located as far apart as possible which in the case of dynamic imbalance can greatly reduce the amount of weight required. In the prior art the operator could have placed the planes at say, 202 mm and 152 mm, and the required weights would have been 3.75 oz. and 5.5 oz. to cause the exact same correction force as 2.5 oz. and 2.00 oz. weights at the more separated plane locations. Second, even if the operator would place the planes as far apart as possible (152 mm, 284 mm) the residual imbalance for the left plane in this example would have been 2.50 oz.−2.39 oz.=0.11 oz., or nearly half a weight increment! Obviously, a slight placement error could add up to even more residual imbalance error, possibly enough to cause more weight to be displayed after the check spin.

Step 2 of the plane location calculation above saves the operator time in cases where the assembly can be balanced with only one weight. As a second example, consider a wheel which is balanced both statically and dynamically and the planes are set at 100 mm and 200 mm. Now add a 0.25 oz. adhesive weight at a distance of 150 mm into the wheel. The wheel now has pure static imbalance which is certainly possible with new tires and wheels. The prior art would call for zero weight at each plane in dynamic mode since to correct for pure static imbalance at the two fixed planes requires half of the 0.25 oz. at each plane (the required amounts of 0.12 oz. fall below the blind amount of 0.25 oz.). The operator would think he's finished when in fact the wheel has 0.25 oz. of static imbalance at that particular diameter. Even if the blind and round amounts are reduced in a "precision" balancing mode, it is completely unnecessary and time consuming to place 0.12 oz. (which still is not an incremental size) at each plane. The present invention recognizes the fact that there is no dynamic imbalance and switches the display to show one 0.25 oz. weight with the plane located in-line with the imbalance. In fact, the present invention easily demonstrates the unique ability to find static weight. If the adhesive weight is moved axially, the plane displayed moves with it after the imbalance measurement spin.

The ability for the CPU to find and set a static plane has a great advantage over static balancing in the prior art as well. It is a fact that if a correction weight is not added at a point directly opposing the centroid of a static heavy spot, a force couple will be induced. For this reason manufacturers recommend placing weights near the center of the rim to reduce residual dynamic imbalance. Unfortunately, most operators are unaware of this fact and place the weight near the left side so they can more easily place the weight. The present invention introduces a new concept for static balancing, then, in that a weight plane distance is used. Before, no "plane" was required to be inputted and the operator could place the static correction weight anywhere he wished at the possible risk of causing dynamic imbalance. Now, a static plane is found and set by the CPU so that the dynamic imbalance is minimized and for cases where the wheel has only static imbalance, no dynamic imbalance is induced at all. Another provision is made to signal the operator in cases where an unacceptable amount of dynamic imbalance will result by using the static balancing mode. This simply automates the past method of constantly switching back to dynamic mode to view the weights, plus the user is made aware of dynamic problems before weights are applied.

Figure 4A:
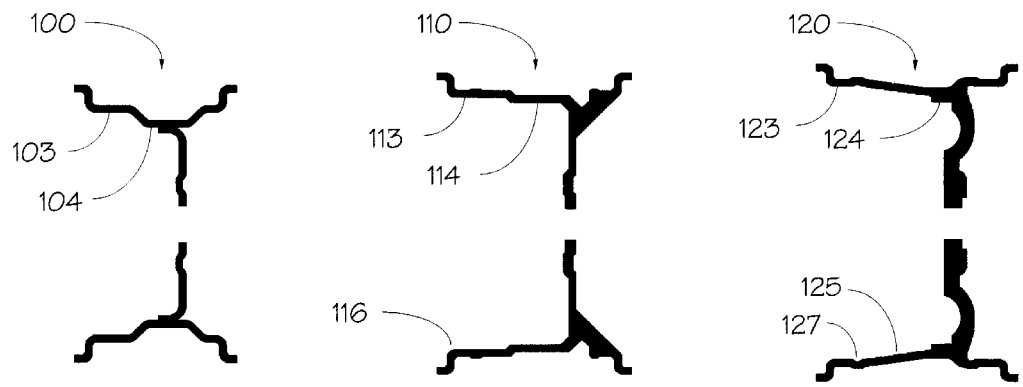
FIG. 4A shows three examples of typical wheel profiles.
Figure 4B:
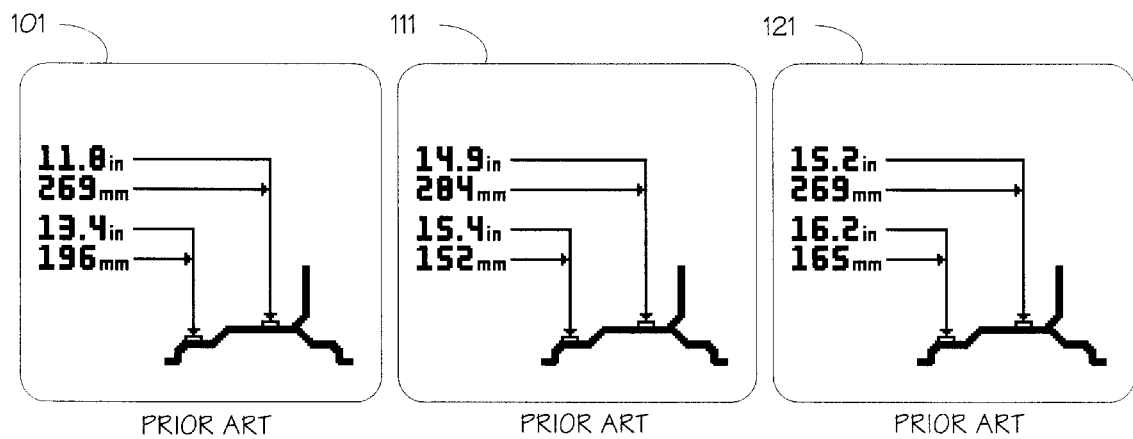
FIG. 4B shows typical prior art display results after measuring the wheels of FIG. 4A.
Figure 4C:
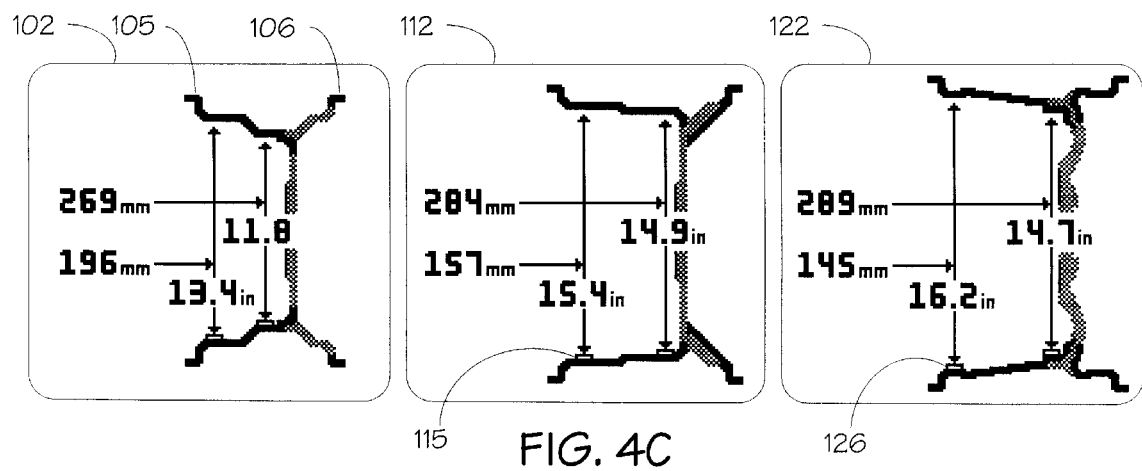
FIG. 4C shows the present invention display results after measuring the wheels of FIG. 4A.

The data obtained from the measurement arm 1 is also used in a novel way for the display. FIG. 4A shows three typical wheel profiles that might be used in a balance mode which places two adhesive weights on the left inside surface of the wheel. It is obvious that these surfaces have very different shapes. The stamped steel wheel 100, although usually used with two clip-on weights, can certainly be mounted and balanced with adhesive weights in cases where the customer wants to hide weights. This is a relatively narrow wheel which offers only two narrow surfaces 103 and 104 for placing adhesive weights. Wheel 110 is a typical aluminum type which has two wide surfaces 113 and 114 available for weights. Wheel 120 is a popular high performance aluminum wheel which has two very narrow surfaces for weights 123 and 124 as well as a slight taper 125 for most of the left interior surface. FIG. 4B shows typical CRT display results 101, 111, and 121 corresponding to each of the wheels in FIG. 4A after inputting the two weight planes with automatic measuring methods of the prior art. Note that because only one diameter and one distance is inputted for each of the two weight plane locations the balancer cannot know what the wheel shape really is; therefore only the dimensions are accurately represented while the wheel and relative weight location display graphics remain identical for any wheel being balanced. Also notable is the fact that no matter where the weight planes are entered the weights are shown in the same place on the display. FIG. 4C shows the present invention display results for the same three wheels. The essentially continuous data array describing the wheel surface is transformed from the physical size to the CRT display coordinate system by simple x-y scaling and the resulting profile is plotted on the display. Surfaces scanned by the pointer ball 7 are represented as solid black while unknown areas are "constructed" by software and shown as the dot pattern for the purposes of the figure in lieu of the color that is actually used. In this way the user understands that the important surface that was actually scanned should be accurately represented but the reconstructed portion may be in error as those surfaces were not scanned. The display wheel 102 does not look quite right for the reconstructed portion; however this could easily be resolved by incorporating a measuring apparatus capable of scanning the rightmost inside surface as well. Another possibility would involve comparing the scanned portion to profiles in a database and finding a recognizable wheel shape to draw on the CRT for the unscanned portion. Alternatively an entire wheel profile array could be recalled from a database after finding the closest match to the scanned wheel area. Note that the right rim lip 106, although not actually scanned, is shown in solid black since it must be a mirror image of the scanned left lip 105 and the physical separation from lip 105 is known in this case from the well known method of manually entering a value measured with a rim width caliper. Display wheel 112 shows how accurately a wheel can be drawn when using the aforementioned measuring apparatus capable of reaching the right side of the wheel. Display wheel 122 shows an example of using a database to determine the unscanned portion of a wheel. The width and slight taper in this case easily identifies the wheel. The pattern for the unscanned shape is retrieved from permanent memory 32 and drawn with the required scaling to match up to the scanned data as shown.

Drawing the actual wheel shape has many advantages over the prior art: First, because the wheel shapes are drawn on the CRT with the same shape, weight, and width as the actual mounted wheel, the user has great confidence that the automatic measuring system worked perfectly. Second, the display weights can now be shown in the actual longitudinal positions (weight plane locations) required, guaranteeing that the user understands where the balancer thinks the weights must be placed. Notice that for display wheel 112 it might seem reasonable that the user would wish to place the left weight 115 a bit closer to left, using the lip bend 116 as a visual guide. The explanation is that the balancer adjusted the left plane location to allow minimal residual imbalance, also adjusting the drawn location of the weight to the exact relative location the real weight will be on the actual wheel. The user has no doubt that the weight must really be placed slightly away from the edge. Display wheel 122 shows that the left weight 126 was calculated to be away from the ridge 127. Display wheel 121 of the prior art, although not at all obvious, shows by the distance digits that the groove is exactly where the user inputted the left plane, in which case the weight will have a hard time staying on because of road water entering the groove under the weight. Also display wheel 122 is showing the operator that the wheel has a substantial taper where otherwise this fact is difficult to realize without cutting the wheel in half. The right plane was wisely calculated to avoid this taper since otherwise the curvature of long weight strips would tilt the bulk of the weight mass away from the weight plane. The displayed wheels of FIG. 4C graphically remind the operator that the correct data is in use for the mounted wheel. These three wheels could be in use at the same time by three different users interrupting each other. As each user recalls his wheel assembly, the present invention presents a graphical verification for the mounted wheel, a definite improvement to being presented one of the displays of FIG. 4B.

It is, of course, possible to further expand the advantages of this display method to display an accurate representation of the tire. Co-pending application Ser. No. 08/594,756 filed Jan. 31, 1996 discloses a radial loaded roller arm which can be used to obtain the diameter of the mounted tire. In addition, a measuring apparatus capable of reaching the right side of the wheel, as mentioned above, could be adapted to also scan the surface of the right half of the tire. The resulting display could then show the tire mounted to the scanned wheel, further confirming user confidence that the data is correct. Patch weight balancing, where adhesive patches are placed inside the tire, also benefits for two reasons: Firstly, the step of measuring the outside diameter of the tire is eliminated. Secondly, patch weights are clearly shown on the display as residing inside the tire, a sharp contrast to the prior art of still showing the weight against the wheel surface.

With the surface scanning and database comparing method of the present invention, it is possible to retrieve other parameters about the mounted assembly that would be useful for other aspects of wheel balancing. These parameters could be the entire wheel profile, wheel mass, spoke arrangement, lug hole arrangement, or any parameter that could be known for a particular wheel once it is identified. Parameters for the most likely mounted tire could also be retrieved, or in the case of using a measuring device capable of scanning the tire surface, parameters for any style tire could be retrieved.

Figure 5:
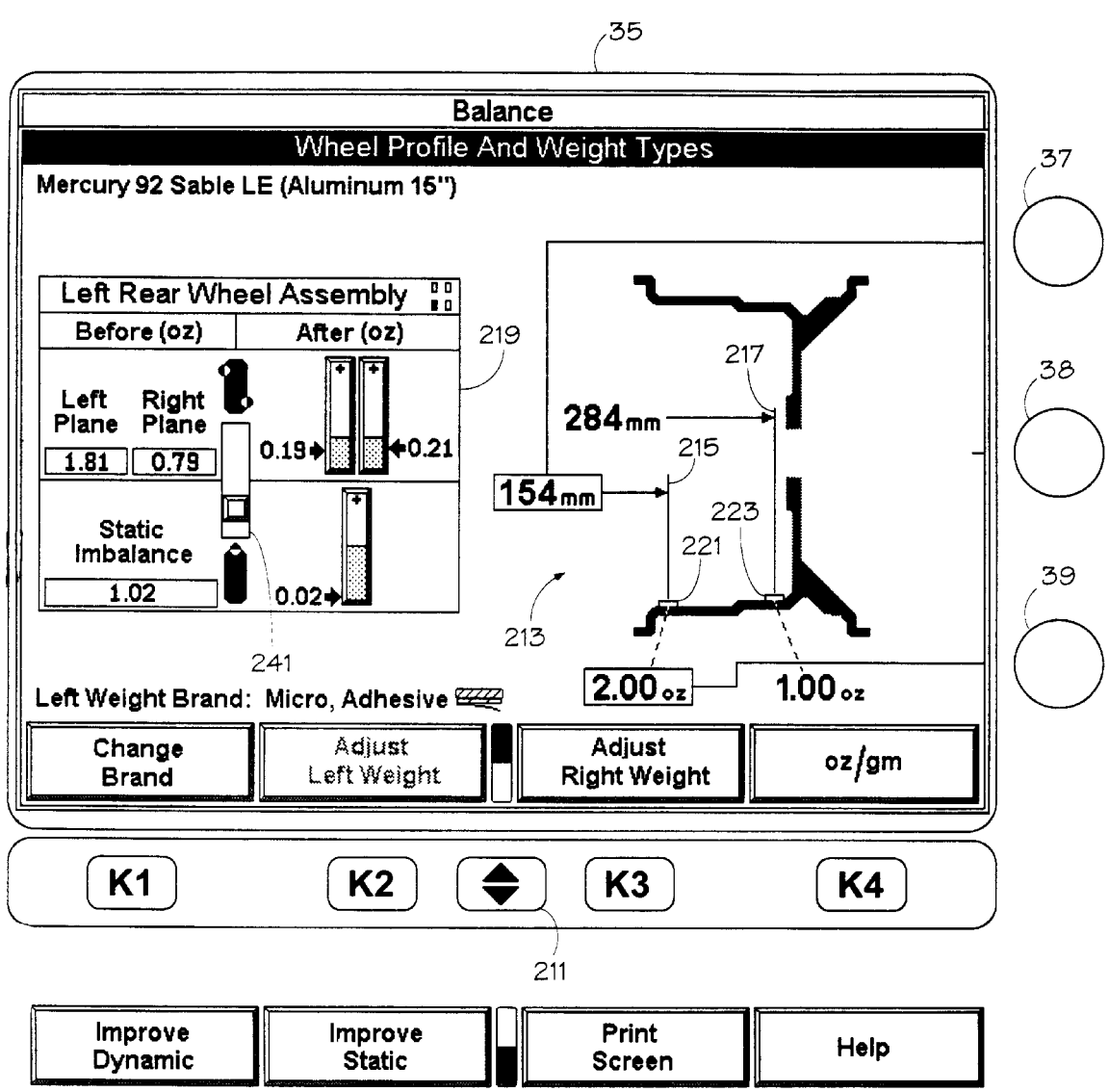
FIG. 5 is a view of the wheel data and a real-time residual imbalance indicator as shown on the present invention's display, used with present invention's weight arrangement adjustment feature.

The display of correction weight locations and magnitudes on display screen 35 is illustrated in FIG. 5. Display screen 35 has associated therewith selector knobs 37, 38 and 39, mentioned above, and a set of four soft keys K1, K2, K3 and K4. The soft keys are used, in conventional manner, to select from choices displayed on the screen. For example, the primary choices "Change Brand", "Adjust Left Weight", "Adjust Right Weight", and "oz/gm" are shown in FIG. 5. An alternative set of choices "Improve Dynamic", "Improve Static", "Print Screen" and "Help" are also displayable. A key 211 is used to select between the sets of displayed choices.

Note that screen 35 also displays the identity of the vehicle wheel under test (in this case a 15" aluminum wheel for a 92–93 Mercury Sable LE), the location of the wheel on the vehicle, and provides the cross-sectional view (here labeled 213) of the scanned profile of the wheel under test. The weight planes (labeled 215, 217) for the correction weights 221, 223 are displayed, along with plane dimensional information ("154 mm" and "284 mm"), and the correction weight amounts ("2.00 oz" and "1.00 oz"). To the left of the cross-sectional profile 213 on screen 35 is shown a residual error display 219 which identifies the particular wheel under test, the residual dynamic imbalance which would remain after the displayed weights are mounted at the required locations, and the static imbalance which would remain in the same situation. Below the residual error display the type of correction weight to be used is displayed.

In most instances, the CPU can determine precise correction weight amounts and placements to eliminate residual imbalance. These amounts, however, usually differ from the incremental weight amounts available. The balancer has the incremental weight amount stored therein, and it knows to only display the proper, incremental amounts. When incremental weights are used, there will be some residual static and dynamic imbalance, in general (although these are minimized by the CPU), and these are displayed in display 219.

In some instances, however, the user will not want to apply the correct weights at the displayed positions. The user may desire to move one of the weight planes to avoid a brake caliper, for example. Or the displayed weight size may be temporarily unavailable. To adjust the left plane position, the user operates knob 37 to move the left plane in and out. Simultaneously, the residual error indications all change to correspond to the new proposed weight plane position, as does the correction weight amount when the new position requires a new incremental weight. Similarly, knob 39 is used to adjust the left plane correction weight amount to the desired value. An adjustment of the weight amount also causes all the residual imbalance displays to be changed, and the weight plane to move as determined by the CPU to minimize the resulting imbalance.

FIG. 3E shows an additional feature provided by the balancer where the wheel has a tapered surface. If a plane is adjusted to coincide with a tapered surface 125 such as that of the wheel in FIG. 4A, the weight plane error due to the adhesive weight strip 225 center of gravity shift CG caused by the taper is taken into account by the balancer. The compensation factor TCF depends on the length of the adhesive strip, the diameter of the wheel at the plane location, and the angle θT of the tapered surface where:

$$TCF = \theta T \sin\left[CG = \frac{wheel\_diameter}{2} \sin\frac{weight\_length}{wheel\_diameter}\right]$$

This compensation is also provided in cases where the balancer automatically determines the plane locations and only tapered surfaces are available for adhesive weight placement.

Although operator control of the left plane and weight amount have been described, it should be understood that the right plane values can be changed similarly by the simple expedient of pressing K3, the "Adjust Right Weight" key, and then using knobs 37 and 39 to adjust the right plane position and correction weight value.

Also shown in residual imbalance display 219 is a slider bar 241 which visually indicates to the user the relative weighting the CPU affords to dynamic versus static imbalance. The user may manually adjust this allocation by pressing the "Improve Dynamic" or "Improve Static" keys (K1 and K2, using the alternative choices) as desired. As the "Improve Static" key is depressed, the indicator on slider bar 241 moves down. Conversely, as the "Improve Dynamic" key is depressed, the indicator moves up. In this way, the user can, instruct the CPU to favor dynamic balance or static balance as desired by adjusting the planes or weights automatically to correspond to the desired allocation.

Figure 6:
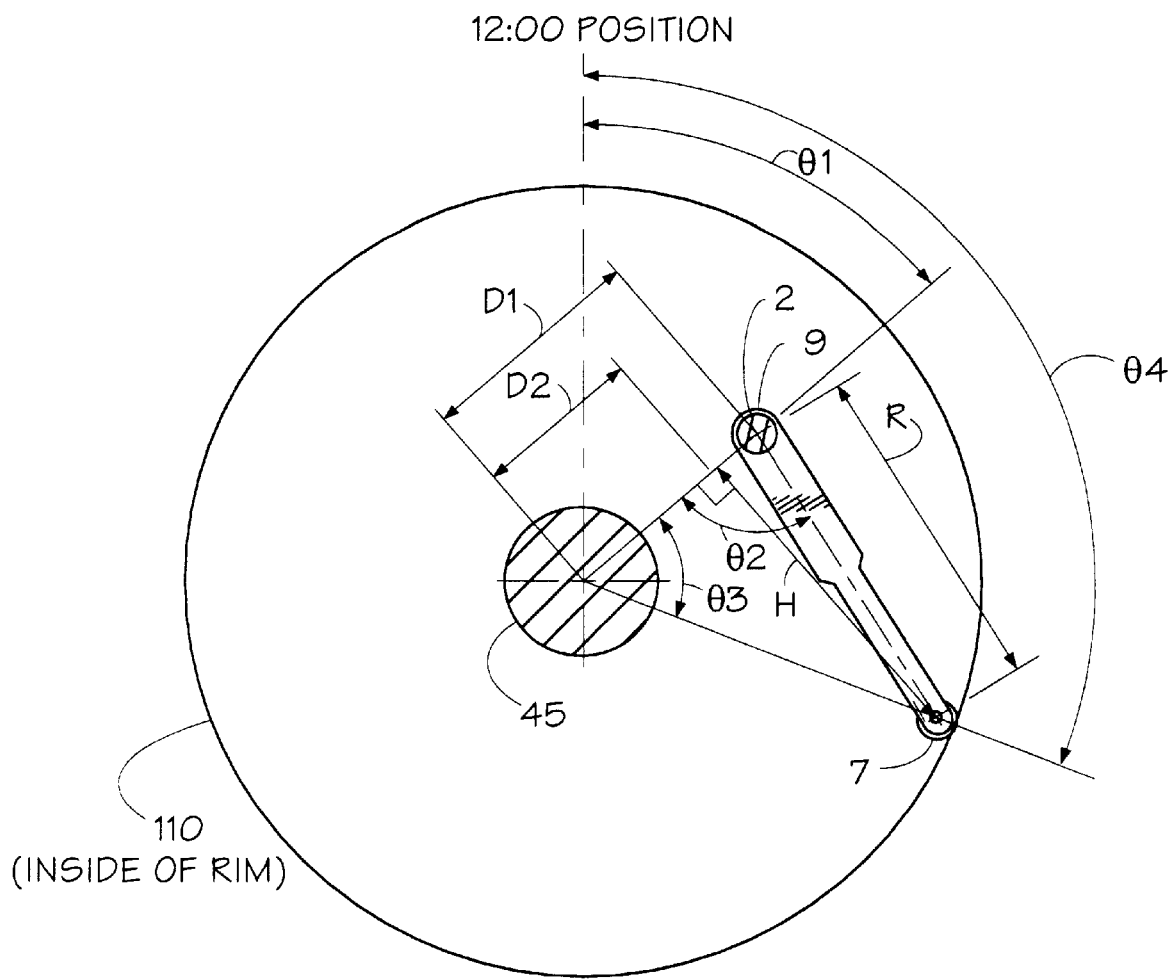
FIG. 6 is a partial cross section view of the vehicle wheel mounted to the balancer, taken through a weight plane and viewed in the direction away from the balancer.
Figure 7A:
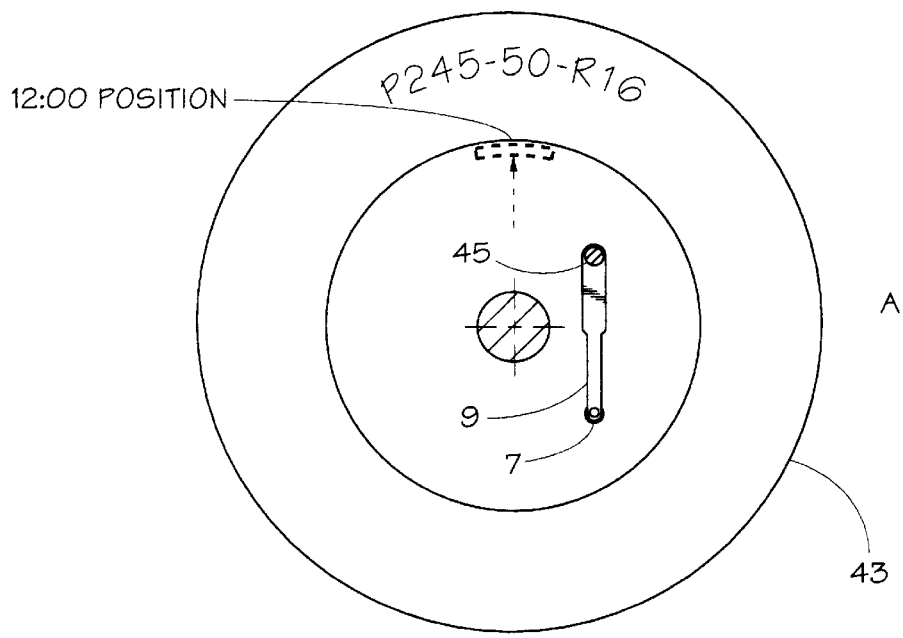
FIG. 7A is the same partial cross section as FIG. 6 with a tire and adhesive weight to illustrate the prior art method of placing an adhesive weight at the 12:00 position.
Figure 7B:
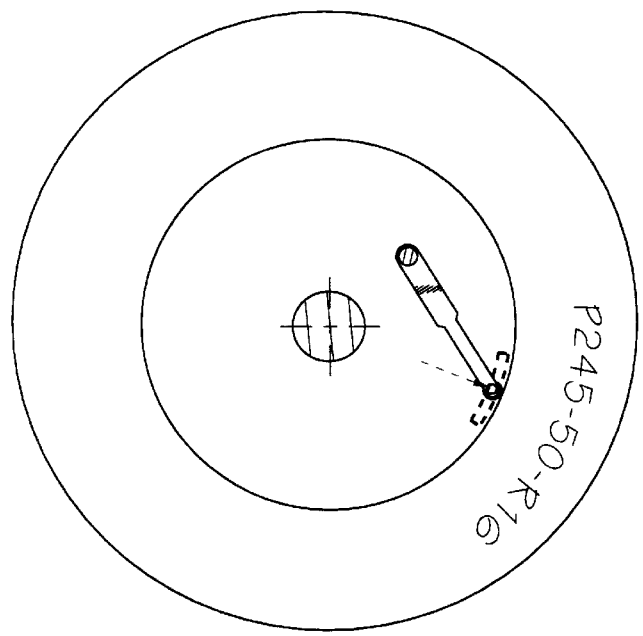
FIG. 7B is the same partial cross section as FIG. 7 and illustrates the present invention's method of placing an adhesive weight at the contact point between a measuring apparatus and the wheel surface.

The present invention also provides a means to overcome operator error when judging the 12:00 position to place an adhesive weight. FIG. 6 shows that with the pointer ball 7 of the measuring device contacting the inside surface of a wheel 110, an angle θ2 is known via the angle transducer 11 (see FIG. 1). The angle displacement θ4 from the 12:00 position to this contact point is calculated as:

$$\theta 4 = \theta 1 + \left[\theta 3 = \arctan\frac{(H = R\sin\theta 2)}{(D2 = D1 - R\cos\theta 2)}\right]$$

where D1 is the known distance from the measuring apparatus sliding shaft 2 from the mounting spindle 45, θ1 is the known angular location of the sliding shaft from the 12:00 position, and R is the known radius of the radius arm 9. As can be seen from FIG. 6 and the above equation, θ4 is a diameter dependent contact angle, since it varies with the diameter of the wheel rim at the contact point. During the operation of placing a weight, the display guides the operator to rotate the wheel to position θ4 rather than the prior art 12:00 position. The contact point is easily viewed compared to looking upside down into the wheel for the 12:00 position. Moreover, the area can be cleaned without rotating the wheel since the weight placement spot is already at a natural position for this action. Notice that from the geometry of FIG. 6, if the thickness of an adhesive weight is inserted between the pointer ball wheel surface, the equation will automatically adjust θ4 for the slight change in the radius arm 9 position. This eliminates the need to pull the arm device away from the weight placement spot before attaching the weight, and also allows the arm disc to be used to initially press on an adhesive weight. It is also possible to include a weight holding device for clip-on or adhesive weight types (not illustrated) in place of or in addition to the pointer disc to eliminate the need to handle the weight while manipulating the input device. FIG. 7A and FIG. 7B show the contrast between the prior art "12:00" method and the present invention. In both cases the weight is placed at the same spot on the wheel (coincident with the "5" in the tire size label), but in the case of the present invention it takes advantage of the existing measuring device to place the weight more easily and accurately.

Figure 8A:
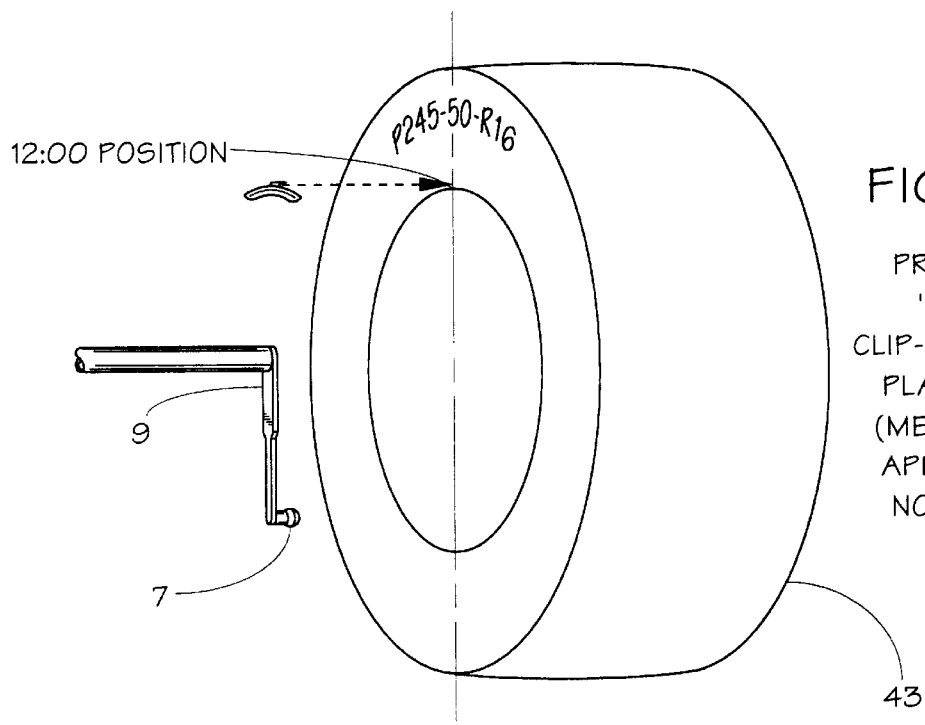
FIG. 8A is a diagrammatic perspective view of the prior art method of placing a rim lip clip-on weight at the 12:00 position.
Figure 8B:
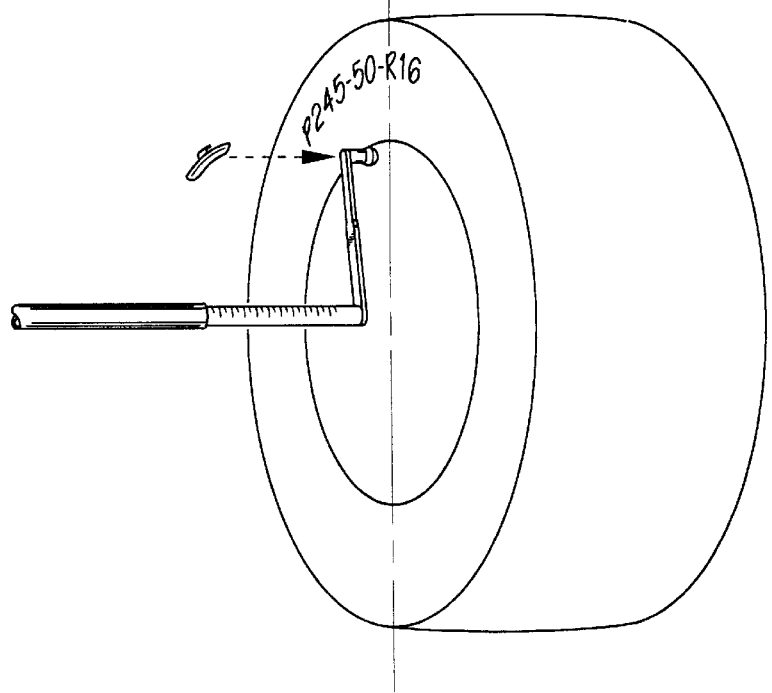
FIG. 8B is a diagrammatic perspective view of the present invention's method of placing a rim lip clip-on weight at the contact point between a measuring apparatus and the wheel rim.

The measuring apparatus is also used to end 12:00 position judgment errors when placing a clip-on weight. The geometry of FIG. 6 shows that if the radius arm 9 is rotated to contact the rim in the up position the measured angle θ2 will be negative, resulting in θ3 being negative and thus still providing the proper calculation of θ4. FIG. 8A and FIG. 8B show the contrast between the prior art "12:00" method and the present invention for placing a clip-on weight. The angular placement spot is quickly and accurately determined, then, without the cost and problems aforementioned with optical weight placement spotters. The present invention could also be used with a holder for clip-on weights as well as using the aforementioned measuring apparatus to place weights on the right (visible) side of the wheel.

The final feature provided by the present invention is the ability to automatically index the wheel assembly to the proper angular location for placing a weight at the pointer ball contact spot (non-12:00 weight placement). The motor control 40 of FIG. 2 has the ability to controllably rotate the wheel assembly to any position desirable and actively hold that position, overcoming all the aforementioned problems associated with mechanical and electrical braking schemes as well as eliminating the step of manually positioning the wheel in the first place. After a spin the CPU causes the motor control to position the wheel for the left plane weight. After the weight is applied the wheel then servos to the right plane position, initiated by one of three methods: A manual input such as a key press, a measuring apparatus that is moved to where the pointer ball is in closer proximity to the right plane than to the left plane, or the tire is pushed with enough predetermined force that the CPU understands that the operator must want the wheel to move to the next position. For a more complete description of the servo drive, refer to co-pending application Ser. No. 08/594,756 filed Jan. 31, 1996 to the assignee. For the method where a measurement device initiates the servo change, the operator is presented with the unique ability of not having to look at the display at all except for noting and selecting the required weights after a spin. The equivalent to this feature in the prior art would be a second operator positioning the wheel and applying a brake as needed so that the first operator can concentrate on placing the weight.

In view of the above, it will be seen that all the objects and features of the present invention are achieved, and other advantageous results obtained. The description of the invention contained herein is illustrative only, and is not intended in a limiting sense.

What is claimed is:

1. A method of determining imbalance correction weight locations for correcting vehicle wheel imbalance, comprising:
   scanning the profile of a vehicle wheel to be balanced;
   obtaining imbalance data for said vehicle wheel;
   electronically determining at least one weight plane location for a correction weight from said scanned wheel profile and said imbalance data, said weight plane location corresponding to an axial position along said scanned wheel profile.

2. The method as set forth in claim 1 wherein two weight plane locations are determined, further including the steps of displaying said weight plane locations and moving at least one weight plane location under user command.

3. The method as set forth in claim 2 further including the step of displaying residual imbalance resulting from weight plane movement to the user.

4. The method of claim 1 further including:
   storing information concerning correction weight increments in a digital controller for a balancer; and,
   automatically determining, from the correction weight increment information and the imbalance data, at least one correction weight value for correcting imbalance and said at least one plane location for said at least one correction weight to minimize residual imbalance of the wheel.

5. The method as set forth in claim 4 wherein two correction weight values in two different planes are determined.

6. The method of claim 1 further including:
   electronically displaying to a human user a graphical representation of the scanned profile; and
   manually comparing said graphical representation with the vehicle wheel.

7. The method of claim 1 further including:
   mounting a vehicle wheel to be balanced on a rotatable shaft of a wheel balancer, said wheel balancer having a wheel contact arm for identifying a wheel contact point, said wheel contact point being horizontally displaced from a vertical plane passing through a spin axis of said shaft;
   sensing imbalance of the vehicle wheel and determining said at least one correction weight placement position to correct said imbalance;
   determining a diameter of the vehicle wheel at the wheel contact point, and determining a diameter dependent contact angle corresponding to said diameter of the vehicle wheel at the wheel contact point; and sensing when the correction weight placement position on the wheel is rotated to said diameter dependent contact angle.

8. The method of claim 7 further including:

sensing the rotational position of said wheel; and, automatically indexing the vehicle wheel so the correction weight placement position corresponds to said diameter dependent weight contact angle for application of the correction weight.

9. The method as set forth in claim 8 wherein at least two correction weight placement positions are determined, further including the step of automatically indexing the vehicle wheel for application of a second correction weight at a second rotational position of the wheel once the wheel contact arm reaches a predetermined position.

10. The method as set forth in claim 9 wherein said predetermined position is approximately halfway between vertical, parallel planes containing the first and second weight placement positions.

11. The method as set forth in claim 8 wherein at least two correction weight placement positions are determined, and further including the step of automatically indexing the rotatable shaft to bring a second portion of the wheel to the diameter dependent rotational position for application of a second correction weight upon receipt of a predetermined manual input.

12. The method as set forth in claim 11 wherein the predetermined manual input includes a manually initiated electronic signal.

13. The method as set forth in claim 12 wherein the predetermined manual input includes a manually initiated rotational force applied to said vehicle wheel.

14. The method of claim 1 further including determining a plurality of correction weight plane locations, weight placement amounts and weight placement angles, the determination of said at least one correction weight plane location or weight placement amount taking into account any shift of the center of gravity of the correction weight which would result from placement of the correction weight on a tapered surface of the wheel.

15. The method as set forth in claim 14 wherein the shift of the center of gravity is a function of the angle of the taper of the tapered surface, the length of the correction weight to be applied, and the diameter of the wheel at the weight plane location.

16. A method of determining imbalance correction weight locations for correcting vehicle wheel imbalance, comprising:

scanning a vehicle wheel to be balanced to obtain the wheel profile;

obtaining imbalance data for the vehicle wheel;

automatically determining, from the wheel profile and the imbalance data, a correction weight plane location for minimizing the amount of weight required to correct the imbalance of the vehicle wheel.

17. A method of determining imbalance correction weight locations for correcting vehicle wheel imbalance, comprising:

scanning a vehicle wheel to be balanced to obtain the wheel profile;

obtaining imbalance data for the vehicle wheel;

automatically determining, from the wheel profile and the imbalance data, when a single correction weight can correct the imbalance of the vehicle wheel.

18. The method as set forth in claim 17 further including automatically displaying an axial position of a weight correction plane to correspond to the location required to balance the wheel with the single correction weight.

19. The method as set forth in claim 17 further including visually signalling a user that a single correction weight can correct the imbalance of the vehicle wheel.

20. A method of assisting a human user in correcting vehicle wheel imbalance, comprising:

scanning the profile of a vehicle wheel to be balanced;

electronically displaying to the human user a graphical representation of the scanned profile;

obtaining wheel imbalance data;

providing a visual display of correction weight plane locations, weight placement amounts and weight placement angles to an operator to correct the wheel imbalance;

receiving operator input signals requesting a change in at least one weight plane location, weight placement amount, number of correction weights, or weight type;

updating the visual display in response to the operator requested change, said updated display including a visual representation of the residual imbalance which would result from placement of at least one correction weight at the location corresponding to the operator requested change;

applying correction weight to the vehicle wheel after the step of updating the visual display.

21. The method as set forth in claim 20 wherein the residual imbalance display is dependent on vehicle or wheel type, a plurality of vehicle or wheel types being stored in a database.

* * * * *